United States Patent [19]

Toda

[11] Patent Number: 4,491,893

[45] Date of Patent: Jan. 1, 1985

[54] GAS FILLED SURGE ARRESTER

[75] Inventor: Toshiharu Toda, Mitaka, Japan

[73] Assignee: Reliance Electric Company, Cleveland, Ohio

[21] Appl. No.: 493,231

[22] Filed: May 10, 1983

[30] Foreign Application Priority Data

May 25, 1982 [JP] Japan ................................ 57-087252

[51] Int. Cl.[3] ................................................ H02H 9/06

[52] U.S. Cl. .................................... 361/120; 361/129; 313/291; 313/346 R; 313/308

[58] Field of Search ............... 361/120, 129, 118, 119, 361/117, 124; 313/306, 308, 231.1, 325, 214, 217, 283, 291, 221, 346 R, 633, 637, 643, 631

[56] References Cited

U.S. PATENT DOCUMENTS

| | | | |
|---|---|---|---|
| 3,588,576 | 6/1971 | Kawiecki | 361/120 X |
| 3,959,696 | 5/1976 | Lange et al. | 361/120 |
| 3,989,985 | 11/1976 | Lange et al. | 361/120 |
| 4,104,693 | 8/1978 | Toda et al. | 361/120 |

*Primary Examiner*—Patrick R. Salce
*Attorney, Agent, or Firm*—Michael M. Rickin

[57] ABSTRACT

A gas filled surge arrester which has an extremely fast response to rapidly increasing surge voltages. A pair of electrodes define a discharge gap which is held in the range of 0.02 mm to 0.25 mm. A high electron emission ability substance partially fills a cavity in each electrode. At least a pair of conductors are associated with each electrode. The conductors define a discharge gap with the opposite electrode. The gap is held in the range of 0.02 mm to 0.30 mm. A gas made up of one or more of the noble gases and hydrogen fills the arrester. The hydrogen is held in the range of 0.1% to 20% of the total volume of the gas in the arrester.

30 Claims, 3 Drawing Figures

GAS FILLED SURGE ARRESTER

BACKGROUND OF THE INVENTION

1. Field of the Invention

This invention relates to a gas filled surge arrester and more particularly to a gas filled surge arrester which is able to respond quickly to rapidly increasing surge voltages.

2. Description of the Prior Art

In recent years there has been substantially increased usage of electronic components and parts, such as transistors, IC's, LSI's, etc. in the circuitry of the equipments to be used in telecommunications and control applications. These electronic elements are known to be susceptible to failure in the presence of overvoltages. In general, for the purpose of protecting these elements, it is necessary to hold surge voltages to less than 1000 volts. In order to protect these equipments from the overvoltage arising as a result of a surge, surge arresters in the form of a gas filled tube or a solid state component such as a varistor, Zener diode, etc. are used.

The gas filled surge arresters of the prior art have the capability of withstanding the surge current which arises as a result of the overvoltage. They also have the advantage of having a small electrostatic capacity. They do, however, have the disadvantage of having a long time lag between the onset of the surge and the initiation of the discharge. Therefore, the prior art gas surge arresters may, in the presence of a rapidly increasing surge voltage, allow that voltage to increase above 1000 volts before discharge is initiated. Thus prior art gas surge arresters are unable to protect electronic parts and components in the presence of rapidly increasing surge voltages.

On the other hand, varistors and Zener diodes respond rapidly to the surge voltages. They do, however, have large electrostatic capacities and their capabilities of withstanding the surge current are inferior to that of the gas filled surge arrester.

In response to a surge voltage building up at the rate of 1 KV/us a prior art gas arrester will take about 0.5 to 0.8 microseconds to initiate its discharge. In fact, for a surge voltage building up at that rate the prior art gas arrester is much slower to respond than a solid state arrester such as a varistor or Zener diode. When the surge voltage builds up at a rate which is only a little more than ten (10) times that given above, the prior art gas arrester does not initiate its discharge until the voltage has increased above 1000 volts. Therefore as stated above, such arresters are incapable of protecting electronic parts and components in the presence of rapidly increasing surge voltages. Thus until the present invention no such arrester having the desired fast response protection and life characteristics was known.

The gas filled surge arrester of the present invention exhibits a substantially decreased time in which it initiates its discharge in the presence of surge voltages which increase at rates which are substantially greater than that given above. For example, it has been shown that the arrester of the present invention initiates its discharge in response to a surge voltage which builds up at a rate which is one thousand (1000) times greater than the above rate at a voltage which is less than 1000 volts. Therefore, the arrester of the present invention is capable of protecting electronic circuitry even in the presence of rapidly increasing surge voltages. Thus, the arrester of the present invention combines the desirable characteristics of small electrostatic capacity, ability to withstand surge current and extremely fast response to rapidly increasing surge voltages.

SUMMARY OF THE INVENTION

According to the present invention there is provided a gas-filled surge arrester which is comprised of a generally cylindrical tubular insulator to the opposite ends of which first and second electrodes are hermetically sealed. The electrodes are of substantially uniform construction and have opposed generally planar end faces. The end faces are spaced apart to define an interelectrode discharge gap therebetween. The gap is maintained in the range of 0.02 mm to 0.25 mm.

The electrodes include at least one pair of opposed cavities which are formed as recesses in the end faces. The cavities occupy less than the entire end face area and have end walls which are spaced apart a distance greater than the width of the interelectrode gap. A substance which has a high electron emission ability relative to the electrodes partially fills each cavity. A gas fills the arrester. The gas is a mixture of one or more of the noble gases and hydrogen. The hydrogen is held to be in the range of 0.1% to 20% of the total volume of the gas in the arrester.

At least one pair of opposed conductors are associated with the first electrode. The pair is deposited on the inner wall of the insulator such that one end of each conductor is connected to that electrode. The conductors are parallel to the insulator's longitudinal axis and extend beyond the interelectrode gap so as to define a first discharge gap with the second electrode. In a similar manner at least one pair of opposed conductors are associated with the second electrode and extend beyond the interelectrode gap to define a second discharge gap with the first electrode.

The conductors of the pair associated with the first electrode being spaced at a predetermined distance on the inner wall from the conductors of the pair associated with the second electrode. The first and second discharge gaps are maintained in the range from 0.02 mm to 0.30 mm.

DETAILED DESCRIPTION

Figure 1:
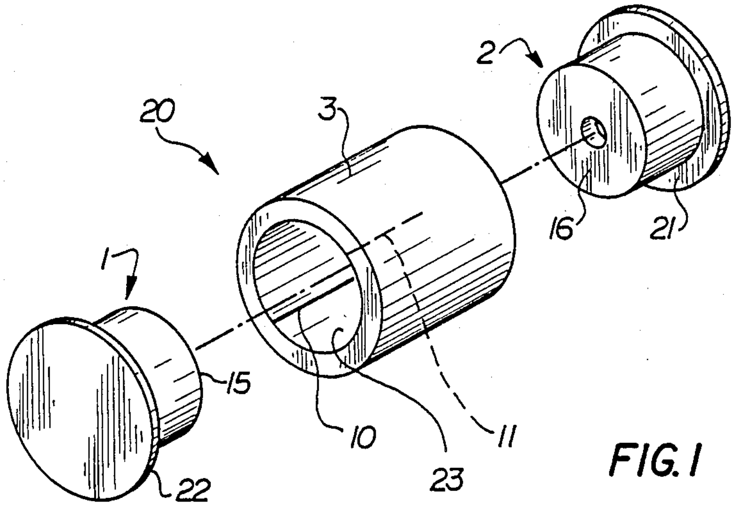
FIG. 1 is an exploded perspective view of a gas-filled surge arrester according to the present invention.
Figure 2:
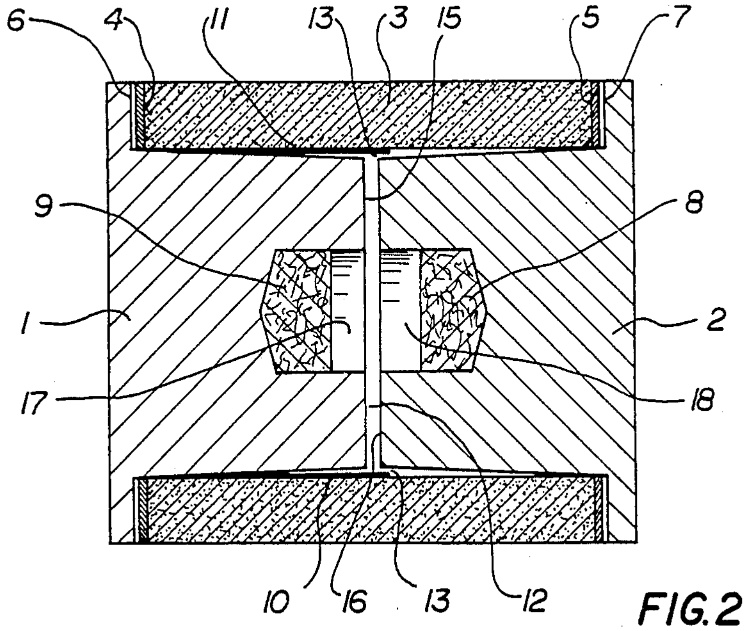
FIG. 2 is a cutaway side elevational view of the gas-filled surge arrester of FIG. 1 assembled.

Referring to FIGS. 1 and 2, a gas-filled surge arrester 20 comprises a pair of electrodes 1 and 2 which are generally circular in cross-section and a generally cylindrical tube 3. The size of the assembled arrester is a relatively small cylinder and may be, by way of example, on the order of nine millimeters high and on the order of eight millimeters in diameter. The electrodes 1 and 2 are formed from any one of a number of suitable metallic conductors which allow the electrodes to be brazed to tube 3. The tube is formed of a suitable insulating material such as ceramic. Preferably, the electrodes 1, 2 are of "solid" rather than of sheet metal construction. The electrodes 1 and 2 are substantially cylindrical in shape and are attached to opposite ends of the tube 3 by suitable means such as rings of brazing material 6 and 7 which may, for example, be silver solder. A metallized material 4, 5 which has been applied to the ends of tube 3, allows the tube and electrodes to be brazed together. The electrodes 1 and 2 are provided with suitable generally annular lips or flanges 21, 22 at their outer or bottom ends to cooperate with the opposite ends of tube 3 and the rings of brazing material 6 and 7 interposed therebetween to form the assembled arrester. Thus, after assembly, the surge arrester may be brazed, as for example by heating in a vacuum oven to exhaust the electrodes and the ceramic tube of gases and to fuse the rings of brazing material 6 and 7 in an atmosphere of a gaseous mixture of one or more rare or noble gases and hydrogen thereby brazing said electrodes 1 and 2 to the tube 3 to form a gas-filled surge arrester.

The tube 3 is of suitable length in the order of 7.5 mm so that the electrodes 1 and 2 when assembled therewith define an arc gap 12 between their inwardly extending opposing faces 15 and 16. In arresters of the prior art this gap is in the order of one (1) mm. In the arrester of the present invention the gap 12 is maintained in the range of 0.02 mm to 0.25 mm. This range is substantially smaller than the gap associated with the prior art arresters. The opposing end faces 15, 16 are generally circular and may be, for example, on the order of five (5) to six (6) mm in diameter.

In accordance with the present invention, the opposing faces 15 and 16 of the electrodes 1 and 2 are provided with at least one pair of generally cylindrical opposing cavities 17 and 18 extending inwardly of the faces 15 and 16, respectively, and away from the arc gap 12. The cavities 17, 18 may be, for example, on the order of 1.5 mm deep and on the order of two (2) mm in diameter. The cavities 17 and 18 are partially filled with a substance 9, 8 of relatively high electron emission ability as compared to the metallic surfaces of faces 15, 16 that are remote from the cavities 17, 18.

It will also be noted that the distance between the end walls of the cavities is greater than the gap 12 between the electrode faces. Further, the material 9, 8 does not completely fill the cavities 17, 18 and, therefore, none of the material 9, 8 is present at faces 15, 16 of electrodes 1, 2.

It is advantageous at this point to describe briefly the desirable physical properties of the material 9, 8 partially filling the cavities 17 and 18 which is a substance of relatively high electron emission ability. It will be noted that electron emission ability is a property also commonly referred to as the "work function" of a material, a high electron emission ability corresponding to a low work function. The substance 9, 8 is then preferably such that it will easily emit electrons.

It has been found that some suitable substances for material 9, 8 include glasses which contain several low work function metals. One such glass known in the art, contains in addition to silica approximately 10% sodium, 1% potassium, 5% calcium and 2% magnesium by weight. After placing the glass in the cavity in a manner so as to partially fill the same, the glass is baked at about 800° C. for about 30 minutes and then cooled naturally by air until the temperature drops to 400° C. At that point the glass is forcibly cooled by use of a blower. The use of this glass has been found advantageous in extending the life of my invention under repeated high current discharges.

The arrester also includes two pairs of conductors which are deposited on the inner wall 23 of tube 3. A first pair of conductors 10, 11 as shown in FIGS. 1 and 2 is deposited on the inner wall 23 such that one end of each conductor is connected to electrode 1. The conductors 10, 11 are deposited in a manner to be described hereinafter, such that they are both parallel to the longitudinal axis of tube 3 and are spaced apart from each other on the inner wall 23 by 180°. While not shown in FIGS. 1 and 2, a second pair of conductors 10' and 11' is also deposited on the inner wall such that one end of each conductor is connected to electrode 2. The conductors 10' and 11' are deposited such that they are both parallel to the longitudinal axis of tube 3, are spaced apart from each other on inner wall 23 by 180° and are spaced apart from conductors 10, 11 by a predetermined distance which is a maximum or 90°.

The length of conductors 10, 11 and 10', 11' is in the order of 3.8 mm and, therefore extend parallel to the longitudinal axis of tube 3 and continue for a distance sufficient so as to extend beyond the width of gap 12. Therefore as shown in FIG. 2, there is defined a gap 13 between the ends of conductors 10 and 11 and electrode 2. Also there is defined a gap 14 (not shown) between the ends of conductors 10' and 11' and electrode 1. In the arresters of the prior art the gaps 13 and 14 are in the order of one (1) mm. As will be described in more detail below, in the operation of my invention the gaps 13, 14 are maintained within the range of 0.02 mm to 0.30 mm. This range is substantially smaller than the gaps associated with the prior art arresters.

Conductors 10, 11 and 10', 11' are preferably of carbon and are usually deposited on inner wall 23 by means of a pencil. An HB pencil has been found satisfactory for this purpose. It is also necessary to avoid any discontinuities in the conductors when they are deposited on the inner wall. Such discontinuities may arise from particles of the metallized material 4, 5 which have settled on the inner wall of the tube during the application of that material to the ends of the tube.

As described above the arrester is brazed in a gaseous atmosphere or mixture which is made up of one or more of the inert or noble gases and hydrogen. Gaseous mixtures which include by total volume approximately equal amounts of the noble gases helium and argon and about 2% hydrogen have been used in prior art arresters. In the arrester of the present invention the hydrogen content of the gaseous mixture is held to be in the range of 0.1% to 20% of the total volume of the gaseous mixture in the arrester.

All arresters whether of the prior art type or constructed in accordance with the teachings of my invention have a predetermined value of voltage at which the arrester will discharge for a slowly rising surge voltage. This voltage is known as the d-c or design breakdown voltage and may be determined from the well known "Paschen" curves. For any given gaseous mixture in the arrester the corresponding Paschen curve therefore shows the d-c breakdown voltage versus the product of the pressure of the mixture and the spacing of the gap 12. Also, as is well known in the art, the actual surge voltage at which the arrester discharges increases as the rate of rise of the surge voltage increases. For any increasing surge voltage, the reaching of the actual discharge voltage is a function of the time that the rising surge voltage continues above the d-c breakdown voltage. Therefore, it is important to the operation of the arrester that that time be minimized even for surge voltages which build up at rapidly increasing rates. It is the minimization of that time which allows the arrester of the present invention to discharge at actual voltages which are below 1000 v for surge voltage rates in excess of 1 KV/ns.

In arresters constructed in accordance with the teachings of my invention, it is the holding of the gaps 13, 14 in the range described above in conjunction with the combination of holding of gap 12 in the range described above and the gaseous mixture described above which allows that time to be minimized even for rapidly increasing rates of surge voltage. It is believed that use of the conductors 10, 11 and 10', 11' and holding the gaps 13, 14 to be in the range of 0.02 mm to 0.30 mm aids the onset of discharge of the arrester to thereby keep to a minimum, even as the surge rates increase, the time described above. The conductors 10, 11 and 10', 11' and their spacing therefore allows the discharge to occur at a voltage which is lower than and therefore in a time which is shorter than that which would occur if the conductors gaps were spaced as in prior art arresters.

Upon the onset of the discharge brought about by the conductors and their gaps a Townsend discharge begins in the arrester. It is also desirable to the operation of the arrester to minimize the time for this discharge to take place even as surge voltage rates rapidly increase. It is believed that it is the combination of maintaining the gaseous mixture in the volumetric proportions described above and gap 12 and gaps 13 and 14 in the ranges described above which enables the arrester of the present invention to minimize this time.

Figure 3:
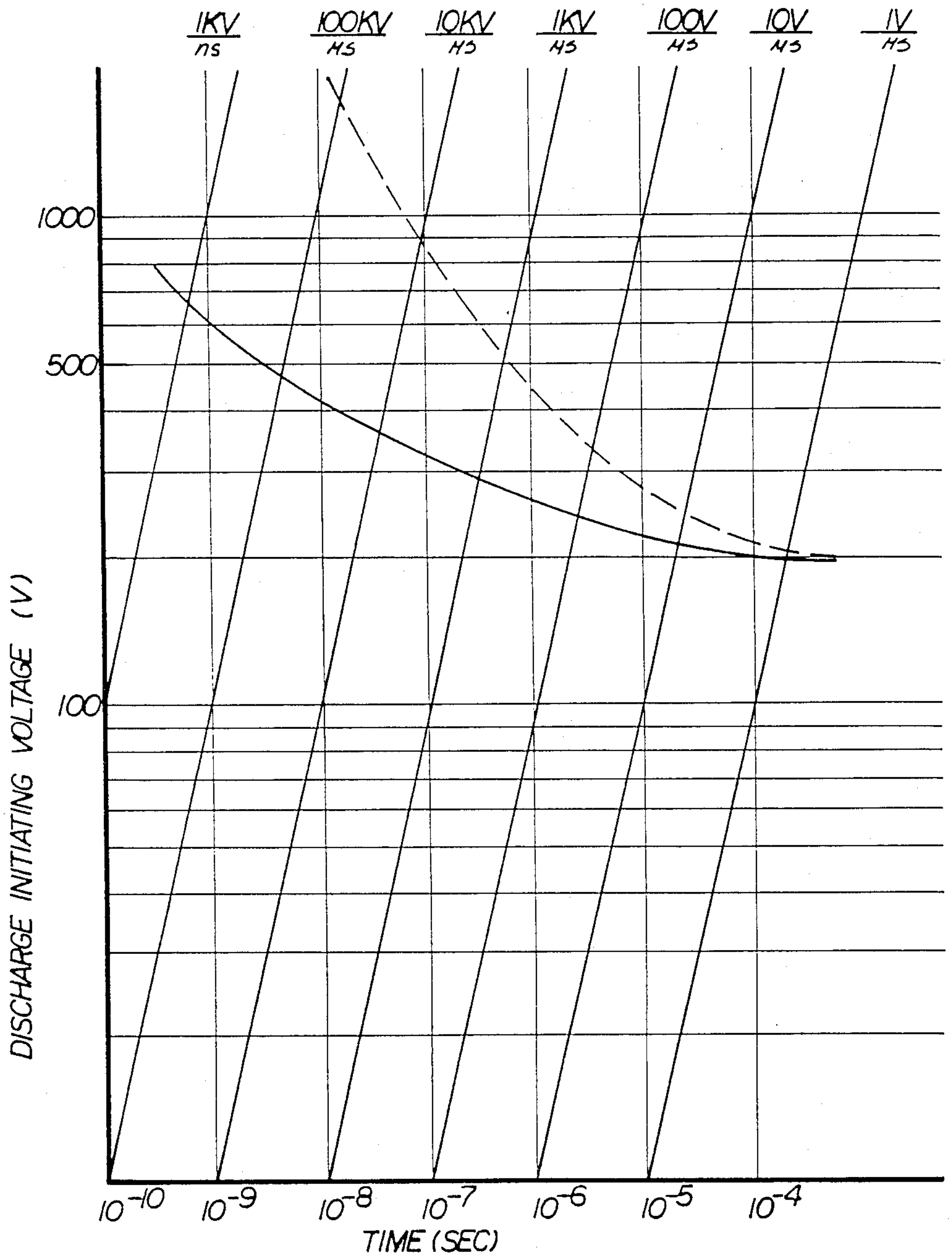
FIG. 3 is a graph which shows the time for the arrester of the present invention to initiate discharge as compared to a conventional prior art gas arrester for various rates of surge voltage increase.

Referring to FIG. 3 there is shown a graph having as its horizontal axis time in seconds and as its vertical axis the surge voltage at which discharge is initiated. For ease of illustration the horizontal (time) axis does not start at zero but rather at $10^{-10}$ seconds, i.e. 0.1 nanoseconds and is then broken up into equally spaced divisions which are related to each other by a factor of ten (10). The vertical axis is logarithmic in nature.

The graph includes a family of solid, straight lines, each of which represent a rate of increase of surge voltage with time. This family of lines ranges from a rate of 1 V/us at the extreme right to 1 KV/ns at the extreme left. Each line represents a rate of increase which is ten times faster than the rate of increase represented by the line to its immediate right. Therefore when the surge voltage increases at the rate of 1 KV/us, it takes 1 microsecond for the voltage to reach 1000 volts whereas when it builds up at a rate 1000 times faster (i.e. 1 KV/ns), it takes only 1 nanosecond (i.e. 1/1000th of the time) to reach that voltage.

Also shown in FIG. 3 are the solid and dotted lines which represent, in the case of the solid line, the impulse breakdown voltage characteristic curve of the arrester of the present invention, and in the case of the dotted line, the impulse breakdown voltage characteristic curve of a conventional prior art arrester. For purposes of comparison, both the prior art arrester and the arrester of the present invention were designed to have the same d-c breakdown voltage. That voltage was selected to be in the order of 200 volts which is considered to be well above the ordinary voltages present in the types of systems wherein the arrester of the present invention would be considered for use.

When the surge voltage builds up at the rate of 1 KV/us, the arrester of the present invention is twice as fast as the prior art arrester in initiating its discharge. Both arresters, however, initiate their discharges well before the surge voltage has built up to the undesirable 1000 volt amplitude. As the buildup rate of the surge voltage increases the superiority of the arrester of the present invention in initiating discharge before the voltage reaches 1000 volts as compared to the prior art arrester becomes clear as soon as the buildup rate exceeds 10 KV/us. At rates which are faster than that rate the prior art arrester does not initiate its discharge until the voltage has increased to amounts which are in excess of 1000 volts. The arrester of the present invention, however, still continues to initiate its discharge at voltages well below 1000 volts even for buildup rates in excess of 1 KV/ns.

The arrester of my present invention has been tested in accordance with well known techniques to determine its ability to withstand surge currents. Those tests have shown that the arrester is capable of handling a 10 KA $8\times20$ usec surge current with only minimal change in its operating characteristics. In particular it has been found that even after a surge current of 5 KA $8\times20$ usec has been administered to the arrester ten times in succession that there was no appreciable change in the d-c breakdown voltage of the arrester.

It has also been found that the arrester of the present invention has an electrostatic capacity which is in order of only 2.5 pf. It is desirable that this capacity be as low as possible in order to minimize the effect that the arrester has when it is inserted into the system where it is used.

While the gas-filled surge arrester of the present invention has been shown and described as having only a single pair of opposed cavities it should be appreciated that as is well known in the art there may be any suitable number of opposed pairs of cavities. In addition while the arrester of the present invention has been described as having two pair of conductors 10, 11, 10', 11' it should also be appreciated that there may be any suitable but equal number of conductor pairs associated with each electrode. For example, there may be two pair of conductors associated with each electrode. The conductors of each pair are always in phase opposition with respect to each other and in the case of two pairs are at a maximum phase relationship (90°) with the conductors of the other pair associated with the same electrode. Further, the conductors of the two pairs associated with electrode 1 are at a maximum phase relationship (45°) with respect to the conductors of the two pairs associated with electrode 2.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. A surge arrester comprising:

(a) a generally cylindrical tubular insulator member having an inner wall;

(b) first and second electrodes of substantially uniform composition having opposed generally planar end faces, said electrodes being hermetically sealed to opposite ends of said insulator member, said insulator member serving to isolate electrically said electrodes and to space apart said opposed end faces to define an interelectrode discharge gap therebetween, said gap being maintained in the range of 0.02 mm to 0.25 mm;

(c) a gas filling said arrester said gas being a mixture of one or more gases selected from the noble gases and hydrogen, said hydrogen held to be in the range of 0.1% to 20% of the total volume of said gas in said arrester;

(d) said electrodes including at least one pair of opposed cavities formed as recesses in the end faces and being of a size to occupy less than the full end face area, the cavities having respective end walls which are spaced apart a distance greater than the width of said gap;

(e) a substance of high electron emission ability relative to that of the electrode material, each of said cavities being only partially filled with said substance;

(f) at least one pair of opposed conductors associated with said first electrode and deposited on said inner wall such that one end of each of said conductors is connected to said first electrode and such that said conductors are parallel to said insulator member's longitudinal axis and of a length sufficient to extend beyond said interelectrode gap to define with said second electrode a first discharge gap; and (g) at least one pair of opposed conductors associated with said second electrode and deposited on said inner wall such that one end of each of said conductors is connected to said second electrode and such that said conductors are parallel to said insulator member's longitudinal axis and of a length sufficient to extend beyond said interelectrode gap to define with said first electrode a second discharge gap, said conductors of said pair associated with said first electrode being spaced on said inner wall at a predetermined distance from said conductors of said pair associated with said second electrode and said first and second discharge gaps being maintained in the range from 0.02 mm to 0.30 mm.

2. The arrester of claim 1 wherein said interelectrode gap is maintained in the range of 0.02 mm to 0.20 mm.

3. The arrester of claim 2 wherein said first and second discharge gaps are maintained in the range of 0.02 mm to 0.20 mm.

4. The arrester of claim 1 wherein said interelectrode gap and said first and second discharge gaps are each maintained in the range of 0.02 mm to 0.20 mm.

5. The arrester of claim 1 wherein said noble gases are helium and argon.

6. The arrester of claim 4 wherein said noble gases are helium and argon.

7. The arrester of claim 1 wherein said interelectrode gap is maintained in the range of 0.07 mm to 0.13 mm.

8. The arrester of claim 7 wherein said noble gases are helium and argon.

9. The arrester of claim 8 wherein said hydrogen is held to be 2% of the total volume of said gas in said arrester and said helium and argon are each held to be 49% of the total volume of said gas.

10. The arrester of claim 1 wherein said high electron emission ability substance is a glass comprising silica, sodium, potassium, calcium and magnesium.

11. The arrester of claim 10 wherein said substance comprises about 10% sodium, 1% potassium, 5% calcium and 2% magnesium by weight.

12. The arrester of claim 4 wherein said high electron emission ability substance is a glass comprising silica, sodium, potassium, calcium and magnesium.

13. A surge arrester comprising:

(a) a generally cylindrical tubular insulator member having an inner wall;

(b) first and second electrodes of substantially uniform composition having opposed generally planar end faces, said electrodes being hermetically sealed to opposite ends of said insulator member, said insulator member serving to isolate electrically said electrodes and to space apart said opposed end faces to define an interelectrode discharge gap therebetween, said gap being maintained in the range of 0.02 mm to 0.20 mm;

(c) a gas filling said arrester said gas being a mixture of one or more gases selected from the noble gases and hydrogen, said hydrogen held to be in the range of 0.1% to 20% of the total volume of said gas in said arrester;

(d) said electrodes including at least one pair of opposed cavities formed as recesses in the end faces and being of a size to occupy less than the full end face area, the cavities having respective end walls which are spaced apart a distance greater than the width of said gap;

(e) a substance of high electron emission ability relative to that of the electrode material, each of said cavities being only partially filled with said substance;

(f) at least one pair of opposed conductors associated with said first electrode and deposited on said inner wall such that one end of each of said conductors is connected to said first electrode and such that said conductors are parallel to said insulator member's longitudinal axis and of a length sufficient to extend beyond said interelectrode gap to define with said second electrode a first discharge gap; and (g) at least one pair of opposed conductors associated with said second electrode and deposited on said inner wall such that one end of each of said conductors is connected to said second electrode and such that said conductors are parallel to said insulator's member's longitudinal axis and of a length sufficient to extend beyond said interelectrode gap to define with said first electrode a second discharge gap, said conductors of said pair associated with said first electrode being spaced on said inner wall at a predetermined distance from said conductors of said pair associated with said second electrode and said first and second discharge gaps being maintained in the range from 0.02 mm to 0.20 mm.

14. A surge arrester comprising:

(a) a generally cylindrical tubular insulator member having an inner wall;

(b) first and second electrodes of substantially uniform composition having opposed generally planar end faces, said electrodes being hermetically sealed to opposite ends of said insulator member, said insulator member serving to isolate electrically said electrodes and to space apart said opposed end faces to define an interelectrode discharge gap therebetween, said gap being maintained in the range of 0.07 mm to 0.13 mm;

(c) a gas filling said arrester said gas being a mixture of helium, argon and hydrogen, said hydrogen held to be 2% of the total volume of said gas in said arrester and said helium and argon are each held to be 49% of the volume of said gas;

(d) said electrodes including at least one pair of opposed cavities formed as recesses in the end faces and being of a size to occupy less than the full end face area, the cavities having respective end walls which are spaced apart a distance greater than the width of said gap;

(e) a substance of high electron emission ability relative to that of the electrode material, each of said cavities being only partially filled with said substance;

(f) at least one pair of opposed conductors associated with said first electrode and deposited on said inner wall such that one end of each of said conductors is connected to said first electrode and such that said conductors are parallel to said insulator's member's longitudinal axis and of a length sufficient to extend beyond said interelectrode gap to define with said second electrode a first discharge gap; and (g) at least one pair of second conductors associated with said second electrode and deposited on said inner wall such that one end of each of said conductors is connected to said second electrode and such that said conductors are parallel to said insulator member's longitudinal axis and of a length sufficient to extend beyond said interelectrode gap to define with said first electrode a second discharge gap, said conductors of said pair associated with said first electrode being spaced on said inner wall at a predetermined distance from said conductors of said pair associated with said second electrode and said first and second discharge gaps being maintained in the range from 0.02 mm to 0.30 mm.

15. The arrester of claim 1 wherein said predetermined distance is a maximum.

16. The arrester of claim 13 wherein said predetermined distance is a maximum.

17. The arrester of claim 14 wherein said predetermined distance is a maximum.

18. A gas filled surge arrester comprising:

(a) a generally cylindrical tubular insulator member having an inner wall;

(b) first and second electrodes of substantially uniform composition having opposed generally planar end faces, said electrodes being hermetically sealed to opposite ends of said insulator member, said insulator member serving to isolate electrically said electrodes and to space apart said opposed end faces to define an interelectrode discharge gap therebetween, said gap being maintained in the range of 0.02 mm to 0.20 mm;

(c) said electrodes including at least one pair of opposed cavities formed as recesses in the end faces and being of a size to occupy less than the full end face area, the cavities having respective bottom end walls which are spaced apart a distance greater than the width of said gap; and (d) a substance of high electron emission ability relative to that of the electrode material, each of said cavities being only partially filled from said bottom end wall to a height which is less than the depth of each of said cavities with said substance.

19. The arrester of claim 18 including first and second conductors each of which are deposited on said inner wall at a predetermined distance from each other such that one end of said first conductor is connected to said first electrode and is of a length sufficient to extend beyond said interelectrode gap to define with said second electrode a first discharge gap and one end of said second conductor is connected to said second electrode and is of a length sufficient to extend beyond said interelectrode gap to define with said first electrode a second discharge gap and said first and second discharge gap being maintained in the range from 0.02 mm to 0.20 mm.

20. The arrester of claim 19 further including a gas filling said arrester, said gas being a mixture of one or more gases selected from the noble gases and hydrogen, said hydrogen being held to be in the range of 0.1% to 20% of the total volume of said gas in said arrester.

21. The arrester of claim 20 wherein said predetermined distance is a maximum and said first and said second conductors are each parallel to said insulator member's longitudinal axis.

22. The arrester of claim 18 including:

(a) at least one pair of opposed conductors associated with said first electrode and deposited on said inner wall such that one end of each of said conductors is connected to said first electrode and such that said conductors are parallel to said insulator member's longitudinal axis and of a length sufficient to extend beyond said interelectrode gap to define with said second electrode a first discharge gap; and (b) at least one pair of opposed conductors associated with said second electrode and deposited on said inner wall such that one end of each of said conductors is connected to said second electrode and such that said conductors are parallel to said insulator member's longitudinal axis and of a length sufficient to extend beyond said interelectode gap to define with said first electrode a second discharge gap, said conductors of said pair associated with said first electrode being spaced on said inner wall at a predetermined distance from said conductors of said pair associated with said second electrode and said first and second discharge gaps being maintained in the range from 0.02 mm to 0.30 mm.

23. The arrester of claim 22 wherein said predetermined distance is a maximum.

24. The arrester of claim 22 further including a gas filling said arrester, said gas being a mixture of one or more gases selected from the noble gases and hydrogen, said hydrogen being held to be in the range of 0.1% to 20% of the total volume of said gas in said arrester.

25. The arrester of claim 23 further including a gas filling said arrester, said gas being a mixture of one or more gases selected from the noble gases and hydrogen, said hydrogen being held to be in the range of 0.1% to 20% of the total volume of said gas in said arrester.

26. The arrester of claim 20 wherein each of said first and said second conductors are parallel to said insulator member's longitudinal axis.

27. A gas filled surge arrester comprising:

(a) a generally cylindrical tubular insulator member having an inner wall;

(b) first and second electrodes of substantially uniform composition having opposed generally planar end faces, said electrodes being hermetically sealed to opposite ends of said insulator member, said insulator member serving to isolate electrically said electrodes and to space apart said opposed end faces to define an interelectrode discharge gap therebetween, said gap being maintained in the range of 0.02 mm to 0.25 mm;

(c) said electrodes including at least one pair of opposed cavities formed as recesses in the end faces and being of a size to occupy less than the full end face area, the cavities having respective end walls which are spaced apart a distance greater than the width of said gap;

(d) a substance of high electron emission ability relative to that of the electrode material, each of said cavities being only partially filled with said substance;

(e) a first conductor deposited on said inner wall such that one end of each of said conductor is connected to said first electrode and of a length sufficient to extend beyond said interelectrode gap to define with said second electrode a first discharge gap; and (f) a second conductor deposited on said inner wall such that one end of each of such conductor is connected to said second electrode and of a length sufficient to extend beyond said interelectrode gap to define with said first electrode a second discharge gap, said first conductor being spaced on said inner wall at a predetermined distance from said second conductor and said first and second discharge gaps being maintained in the range from 0.02 mm to 0.30 mm.

28. The arrester of claim 27 further including a gas filling said arrester, said gas being a mixture of one or more gases selected from the noble gases and hydrogen, said hydrogen being held to be in the range of 0.1% to 20% of the total volume of said gas in said arrester.

29. The arrester of claim 28 wherein said first and said second conductors are each parallel to said insulator member's longitudinal axis.

30. The arrester of claim 28 wherein said predetermined distance is a maximum and said first and said second conductors are each parallel to said insulator member's longitudinal axis.

* * * * *